Nov. 28, 1967    D. W. HAMM    3,355,180
NARROW GROOVE PISTON RING
Filed Oct. 8, 1965    2 Sheets-Sheet 1

INVENTOR.
DOUGLAS W. HAMM
BY
ATTORNEYS

Nov. 28, 1967  D. W. HAMM  3,355,180
NARROW GROOVE PISTON RING
Filed Oct. 8, 1965  2 Sheets-Sheet 2
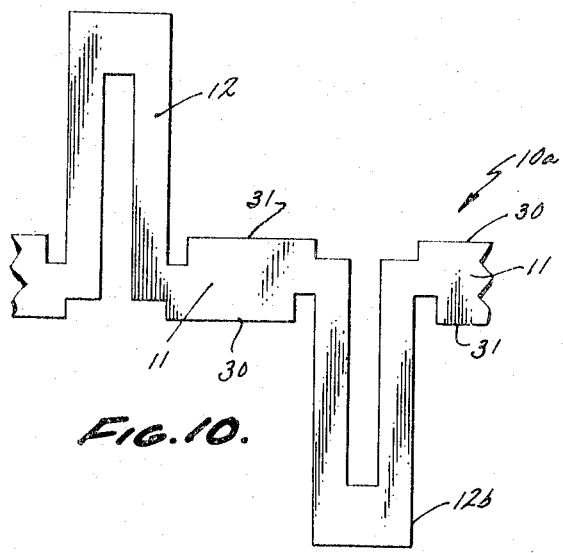
FIG.10.
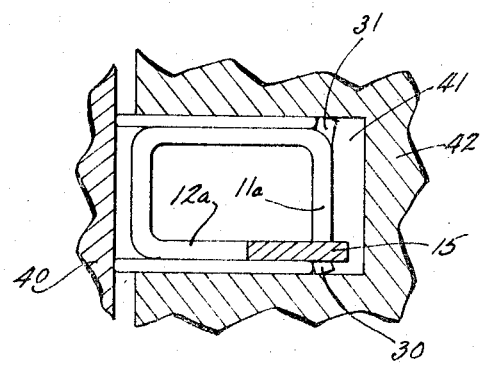
FIG.9.
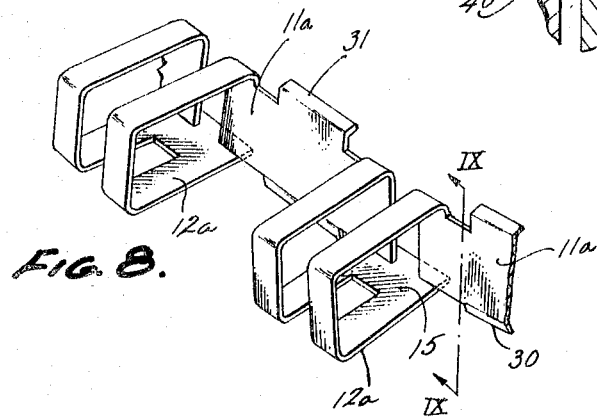
FIG.8.
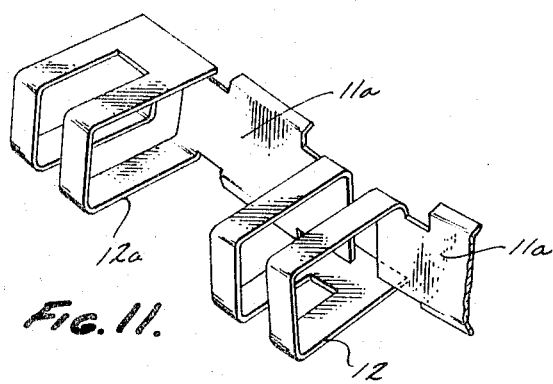
FIG.11.
INVENTOR.
DOUGLAS W. HAMM
BY 
ATTORNEYS United States Patent Office 3,355,180
Patented Nov. 28, 1967

3,355,180
NARROW GROOVE PISTON RING
Douglas W. Hamm, Muskegon, Mich., assignor to Muskegon Piston Ring Company, Muskegon, Mich., a corporation of Michigan
Filed Oct. 8, 1965, Ser. No. 494,085
9 Claims. (Cl. 277—139)

This invention relates to piston rings, and more particularly to a piston ring designed to solve the problems being created by the reduction in piston ring groove widths.

The automotive industry is placing increased emphasis upon the reduction in the height and mass of the engine. In developing engine designs of lower silhouette, the industry has progressively shortened the stroke, redesigned the heads and shortened the pistons used in the engine. The reductions in size have been such that the piston can now only be reduced in length by reducing the width of the piston ring grooves. Prior reductions in piston length have been such that the land spacing between the ring grooves has been reduced to a minimum, and further reductions in piston length can be obtained only by reducing the width of the ring grooves themselves. There was a time when the oil ring groove had a width of $7/32$. It was then reduced to $3/16$, and now is being reduced to $1/8$.

At the same time, the demands placed upon the engine are such that the efficiency of the rings must be maintained and in fact improved despite the fact that the rings themselves are being made smaller and being squeezed into less and less operating space. Because of the emphasis being given to control of blow-by and oil consumption, it is most important that the efficiency of the rings be increased. At the same time, higher octane fuels are being utilized, compression ratios are being increased, and the pressures which the rings must effectively seal are constantly increasing. These add to and seriously complicate the problems of designing rings having satisfactory operating characteristics suitable for the new type of narrow groove.

Under these circumstances, the stock from which the ring is manufactured must be reduced in thickness. At the same time, it is essential that the openness of the ring be maintained to prevent sticking due to the ring becoming clogged with carbonized deposits.

A certain amount of the width of the groove must be allocated to the radii required to form the stock into the finished ring. For any particular thickness of steel, even when it is fully annealed, there is a limit beyond which the radius of bend cannot be reduced without structural weakness. To conserve space in the groove for the rest of the ring body, these radii must be reduced. The only approach to this problem is reduction in stock thickness. This creates a number of problems because resulting structure is inherently weaker. Therefore, complete redesign of the ring is necessary to compensate for loss of strength.

These factors materially affect the approaches which must be utilized in producing an effective ring design. The thinner stock and the cramped operating conditions necessitate designs having higher strength and greater resistance to both permanent set and temporary deflection under increased operating loads, as well as more prolonged periods of continuous operation under near-maximum capacity demands.

One of the most serious problems which has arisen out of this combination of new requirements is that of providing a ring with sufficient connecting web structure to sustain the high unit loadings necessary to generate the required radial tension. This problem is aggravated by the fact that the reduced ring width confines this web to a very limited area. Since the stock from which the ring is fabricated must be of reduced thickness, the webs are weaker. The combination of limited web widths and reduced stock thickness combine to make it necessary to utilize designs which permit the webs to realize the maximum width afforded them by the reduced groove width.

A primary object of this invention is to provide a piston ring so designed that it takes maximum advantage of the confined area which can be allocated to the web.

At the same time, this invention provides a spacer-expander structure affording positive support for the rails, maintaining them at all times in accurate axial spacing. The spacer-expander structure is such that it generates the desired degree of radial tension for application to the rails.

These and other objects and purposes of this invention will be understood by those acquainted with the design of piston rings upon reading the following specification and the accompanying drawings.

In the drawings:

FIG. 8 is a fragmentary, oblique view of a modified construction for the spacer-expander embodying this invention;

FIG. 9 is a sectional elevation view taken along the plane IX—IX of FIG. 8 illustrating the spacer-expander with rails assembled thereon and installed in a ring groove;

FIG. 10 is a fragmentary, plan view of a modified blank for the spacer-expander of this invention; and FIG. 11 is a fragmentary, oblique view of a spacer-expander made from the blank illustrated in FIG. 10.

In executing this invention, the ring is formed from an elongated ribbon having a series of spaced webs arranged along one edge of the ribbon, connected by long, narrow, U-shaped springs or fingers which extend crosswise of the blank. These springs form a substantial portion of the width of the blank. The spring portions are folded into a rectangular box-like structure having a pair of parallel side forming rail seats and one side forming a pillar positively supporting the rail seats at the outer face of the ring and spaced from the connecting webs. In the preferred form of this invention, all of the springs project from the same edge of the webs making the blank non-symmetrical about its longitudinal centerline. This permits the use of stock of minimal width. However, if the stock width is increased, alternate spring could project from opposite sides of the blank, producing a symmetrical structure.

Figure 1:
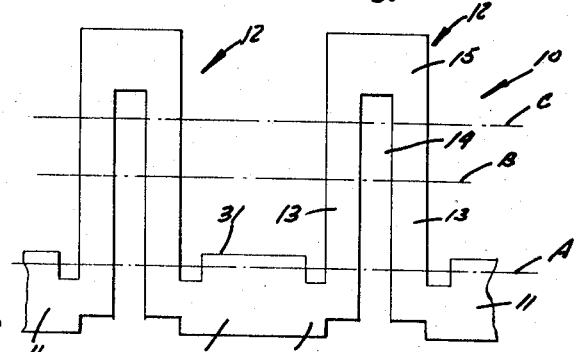
FIG. 1 is a fragmentary, plan view of the blank from which this ring is fabricated.

Referring specifically to FIG. 1, the numeral 10 indicates a blank having a plurality of connecting webs 11 which are spaced apart lengthwise of the blank and are all arranged along one side of the blank. By far the major portion of the width of the blank is formed by U-shaped spring members 12. Each of the spring members 12 has a pair of elongated legs 13 spaced apart lengthwise of the blank by a deep, narrow slot 14 opening through the blank along the same edge as the webs 11 are arranged. Thus, the slot 14 forms the gap or separation between the webs. The edge of the blank opposite from the connecting webs 11 is formed collectively by a group of connecting bars 15 which join the opposite ends of the legs 13 and form the base portions of the springs 12. Thus, the blank is non-symmetrical about its longitudinal centerline since a major portion of its mass and body is arranged along one edge. Because of the length of the legs 13, it will be noted that considerable compression or stretching of the blank could be effected, since collectively, the legs permit a significant degree of springing or give in the blank.

To form the ring from the blank, the springs 12 are all first formed over a 90° bend A which is closely adjacent the webs 11 (FIG. 1). This bend is as close to the webs as it is possible to make it within the radius requirements of the particular type and gauge of metal being used. The use of the thinner material permits this radius to be reduced.

At a point spaced outwardly from the first bend line A, the springs are again formed through a 90° bend B to extend parallel to the webs 11. The ends of the springs are bent through a third 90° bend C so that this latter portion extends parallel to that portion of the springs between the bends A and B. This brings the connecting bars 15 back around to abut the webs 11 (FIGS. 2–6). The portions of the springs between the bends A and B and between the bend C and the ends of the springs, form parallel rail seats 20 and 21. The surface of the rail seat 21 formed by the end portion of the springs is in the plane of the adjacent edge of the webs 11. This is important in a ring of low silhouette such as the ring to which this invention is directed. This permits a maximum amount of the height of the ring to be utilized to form the webs 11. This is essential, if sufficient material is to be present in these legs to give the ring sufficient strength to provide the required radial tension and sufficient fatigue resistance to give the ring durability.

Figure 2:
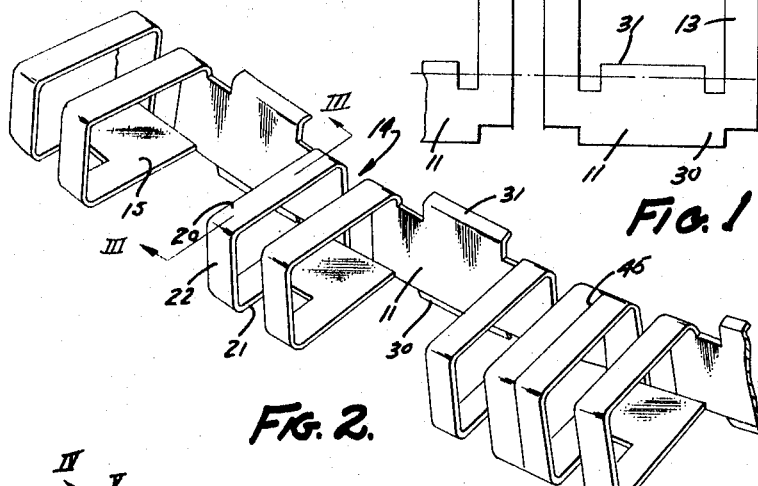
FIG. 2 is a fragmentary, oblique view of a spacer-expander embodying this invention.
Figure 7:
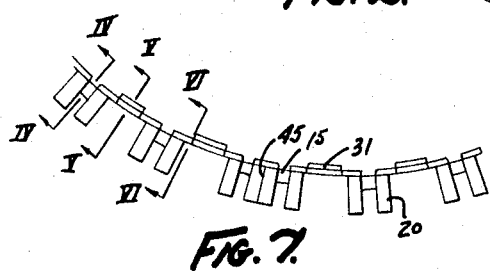
FIG. 7 is a fragmentary, plan view of the spacer-expander embodying this invention.

When the spacer-expander is coiled into its final annular shape, the webs 11 are arranged along the inner bight portion of the body with the rail seats 20 and 21 extending radially outwardly. That portion of the springs between the bend lines B and C form vertical supporting pillars between the rail seats. These pillars provide positive support for the rail seats and for the rails at the outer radial edge of the ring where the maximum load is applied by the rails 23 and 24. This is most important because the low silhouette of the spacer-expander requires the spacer-expander to be fabricated from stock that is thinner than is normally used for this purpose. Thus, the reduced strength of the rail seats must be compensated by the provision of positive rail support adjacent the outer radial edge of the spacer-expander. The spacer-expander, when free, is non-circular, having a part at 45. This part is closed when the spacer-expander is installed as illustrated in FIG. 2.

Figure 3:
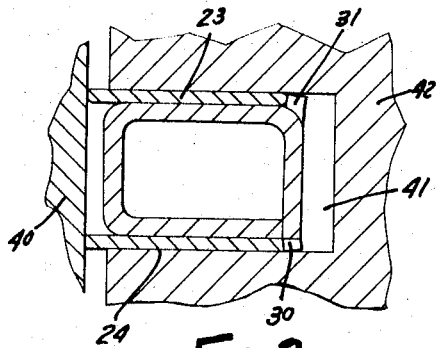
FIG. 3 is a fragmentary, sectional, elevation view of the assembled ring seated in the ring groove taken along the plane III—III of FIG. 2.

Again referring to FIG. 1, it will be seen that each web 11 has an ear projecting from each of its opposite edges. Along one edge are ears 30 and along the inner edge are ears 31. It will be noted that the ears 31 project slightly beyond the bend line A. These ears in the finished spacer-expander extend above the surfaces of the rail seats 20 and 21 and form the rail stops as is illustrated in FIG. 3.

Although the connecting bars 15 which form the continuity of the spacer-expander are adjacent the webs 11 in the completed structure, the length of the legs 13 is such that the spacer-expander has a high degree of flexibility and thus, capability of conforming to the cylinder walls 40. Further, this permits the circumferential length of the spacer-expander to be contracted when the ring is installed in the ring groove 41 of the piston 42 to effect the desired degree of radial tension. If it is desired to increase the stiffness of the ring, this may be done by widening the connecting bar 15, thus reducing the effective length of the spring formed by the legs 13. This does not require redesign of any other portion of the spacer-expander body. Because this connecting bar lies in the plane of the rail seat 21, widening it does not affect the openness of the ring.

FIGS. 8 and 9 illustrate a modification of this invention in which the spring members 12a are somewhat longer than the springs 12 and when formed into the box-like rail seats, the ends of the connecting bars 15 extend radially inwardly beyond the connecting webs 11a. The height of the connecting webs 11a is reduced the thickness of the material of the springs. Thus, over-all width of the assembled ring is not increased. This arrangement permits the over-all length of the spring to be increased and thus, the flexibility of the ring to be increased when desired. It also permits an increase in ring radial depth without change in ring height. This design also has the advantage of providing positive support for the rail seats at both the inner and outer radial ends thereof. Thus, even thinner gauge material may be utilized without reducing the resistance of the rail seats to axial compression.

Figure 4:
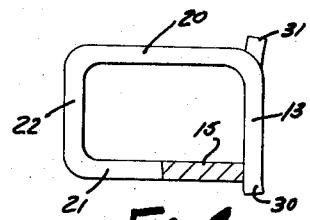
FIG. 4 is a sectional, elevation view taken along the plane IV—IV of FIG. 7.
Figure 6:
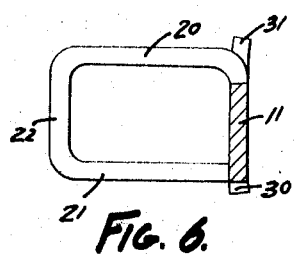
FIG. 6 is a sectional, elevation view taken along the plane VI—VI of FIG. 7.
Figure 5:
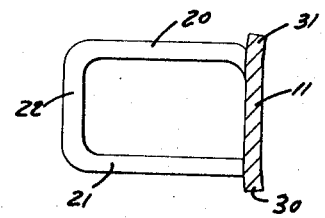
FIG. 5 is a sectional, elevation view taken along the plane V—V of FIG. 7.

FIGS. 10 and 11 illustrate an embodiment of this invention utilizing a symmetrical blank design. The blank 10a has alternate spring members arranged on opposite sides of the centerline of the blank. Thus, the spring members 12 project to one side and the spring members 12b project to the opposite side. When this blank is formed into a ring, alternate ones of the box-like rail seats extend toward opposite sides of the ring as is illustrated in FIG. 11. The spring members 12 and 12b may be so designed that the ends of the spring members abut the connecting webs 11 as illustrated in FIGS. 4 and 5 or extend beyond the connecting webs as illustrated in FIG. 9.

It will be seen that this invention provides a spacer-expander particularly adapted to the exacting requirements of a narrow ring groove, without sacrificing the required characteristics of strength, durability, flexibility and capability of generating radial tension. It will be recognized that while a preferred embodiment of this invention has been illustrated and described that modifications of this embodiment may be made without departing from the principles of the invention. Such modifications are to be considered as included within the hereinafter appended claims, unless the claims, by their language, expressly state otherwise.

I claim:

1. A spacer-expander for a narrow piston ring, said spacer-expander having a one-piece annular body member; said body member having a plurality of circumferentially spaced connection webs arranged along the inner bight portion thereof; a plurality of elongated U-shaped spring members each having a pair of legs and a connecting bar; the ends of said legs of each spring members remote from said connecting bar being integral with an axial edge of said connecting webs, each leg of each pair with a different one of said connecting webs, and said spring members forming the only connection between said connecting webs; each of said spring members being formed into a radially outwardly extending loop having a pair of parallel sides forming a first rail seat and a second rail seat axially spaced from each other; a portion of each of said legs extending axially between said rail seats and forming rigid support pillars arranged along the radially outer face of said body member; the free end of said second rail seat being adjacent said webs.

2. A spacer-expander as described in claim 1 wherein an ear extends from each of opposite edges of each of said connecting webs, said ears projecting axially beyond said rail seats as rail stops.

3. A spacer-expander as described in claim 2 wherein a parted rail is seated on each of said rail seats with its radially inner edge in contact with said rail stops.

4. A spacer-expander for a narrow piston ring, said spacer-expander having a one-piece annular body formed from a ribbon-like blank; said blank in flat pattern having a plurality of connecting webs arranged in tandem along one edge thereof; adjacent webs being connected to each other by elongated spring members each having a pair of legs and a cross bar; said cross bars collectively forming the other edge of said blank, said legs being substantially longer than the width of said connecting webs and constituting substantially more than a major portion of the width of said blank; said legs of each spring being spaced lengthwise of said blank and defining an elongated slot between them opening through said one edge of said blank; said springs adjacent the juncture between said legs and said webs being formed through a first bend to extend radially outwardly normal to the plane of said webs; at a point spaced from said webs said legs being formed through a second bend to extend parallel to said webs and then being formed through a third bend whereby the end portions of said legs and said bars extend radially inwardly and terminate adjacent said webs; the portion of said legs between said first and second bends forming first rail seats and the end portions of said legs forming second rail seats, spaced axially from said first rail seats; said body being so coiled that said webs are arranged along the radially inner face of said body; said rail seats being supported in fixed axial spacing along the radially outer face of said body by the axially extending portions of said legs between said second and third bends; ears projecting from opposite edges of said webs, said ears forming rail seats projecting axially beyond the surfaces of said rail seats.

5. A spacer-expander as described in claim 1 wherein said free ends of said spring members abut said webs with the surfaces of said second rail seats being in the plane of the other of the axial edges of said webs.

6. A spacer-expander as described in claim 1 wherein said free ends of said spring members extend radially inwardly beyond said webs and rest on the adjacent axial edges of said webs.

7. A spacer-expander as described in claim 6 wherein said legs of all of said spring members are integral with the same axial edge of all of said connecting webs.

8. A spacer-expander as described in claim 6 wherein said legs of alternate ones of said spring members are integral with opposite axial edges of said connecting webs.

9. A spacer-expander as described in claim 5 wherein said legs of alternate ones of said spring members are integral with opposite axial edges of said connecting webs.

References Cited

UNITED STATES PATENTS 3,136,559   6/1964   Hamm   277—139
3,191,947   6/1965   Hamm   277—139

SAMUEL ROTHBERG, *Primary Examiner.*